United States Patent [19]

Fries

[11] 4,134,243
[45] Jan. 16, 1979

[54] STRUCTURAL PANELS

[76] Inventor: Donald J. Fries, 4513 Travis, Dallas, Tex. 75205

[21] Appl. No.: 827,665

[22] Filed: Aug. 25, 1977

[51] Int. Cl.$^2$ .................... E04C 2/10; B29C 17/02; B32B 3/12

[52] U.S. Cl. ........................................ 52/596; 52/797; 428/116

[58] Field of Search ............... 52/618, 615, 596, 606, 52/607, 612; 428/116, 178, 180, 131

[56] References Cited

U.S. PATENT DOCUMENTS

| | | | |
|---|---|---|---|
| 2,074,497 | 3/1937 | Voigt | 52/537 |
| 3,108,924 | 10/1963 | Adie | 52/615 |
| 3,597,891 | 10/1969 | Martin | 52/618 |
| 3,919,380 | 11/1975 | Smarook et al. | 428/116 |

FOREIGN PATENT DOCUMENTS 656493  1/1963  Canada .................................... 428/131

*Primary Examiner*—James L. Ridgill, Jr.
*Attorney, Agent, or Firm*—Hubbard, Thurman, Turner, Tucker & Glaser

[57] ABSTRACT

An improved structural panel, apparatus for producing the panel and method for producing the panel are disclosed. The improved panel structure is essentially a three dimensional panel structure having two essential planar face surfaces with a plurality of tapered walled cells lying intermediate the two faces and supporting the faces of the panel structure. Each of the tapered walled cells opens outwardly from the face surfaces of the panel with approximately one-half of the cells opening outwardly on one face surface of the panel and the other half opening outwardly from the other face surface of the panel structure. The walls of the tapered walled cells form a rigid and strong support for the face surfaces of the panel structure. The cross-sectional areas of the tapered walled cells are essentially curvilinear and taper upwardly and outwardly from one face of the structure such that the cross-sectional area of the tapered walled cell is greater at a point removed from its apex than the cross-sectional area near its apex. A shoulder member is formed by the tapered walled structure by a decrease in the cross-sectional area of the tapered walled cell cross-section adjacent the face of the wall structure furthest removed from the apex. The tapered cells have common walls and produce a sealed structure from one face of the panel structure to the other. The disclosed method and apparatus for producing the improved panel structures include a unique mold apparatus wherein two mold halves are utilized. The two mold halves have deformable mold fingers whereby the material the panel structure is to be made from can be placed between the mold halves and the mold halves are closed. The deformable mold fingers are in a non-aligned orientation when the mold halves are closed. Upon closing of the mold halves, the mold fingers can be deformed to produce the tapered wall structures. The deformation of the mold fingers can be by pressure of the mold halves coming together with the material the panel is produced from sandwiched between or by internal pressure that is exerted on the interior of the mold fingers to thereby partially inflate such mold fingers. Following the formation of the structural panels having the tapered walled cell structure, the mold fingers are allowed to return to their undeformed state and are removed from the tapered wall cell structure. The disclosed method and apparatus are especially useful in the production of improved structural panels such as cement type panels that are reinforced with fibrous materials such as asbestos, fiberglass and the like.

9 Claims, 9 Drawing Figures

STRUCTURAL PANELS

BACKGROUND OF THE INVENTION

This invention relates to an improved panel structure and a method and apparatus for producing it. In another aspect, this invention relates to an improved panel structure having improved structural properties of high strength and durability and low weight. In yet another aspect, this invention relates to an improved method and apparatus for producing structural panels.

Within the past few years, various types of lightweight and strong structural panels have been developed. Such structural panels include the well known "honeycomb" structure wherein a honeycomb type cell structure is sandwiched between and adhered to outer skins of various materials such as plastic, metal and the like. Such honeycomb structures have been wisely used as structural panels for the production of aircraft wings, specialized building structures, and the like. Such honeycomb structures are difficult to manufacture in some instances in that several separate steps must be carried out to produce the honeycomb, followed by application of the outer skins and the like. Additionally, the honeycomb structure alone is not load bearing and essentially all of the load bearing characteristics of the assembly come from the outer skins that are usually made from an expensive material such as high tensile metal and the like.

Recently, there have been attempts to produce other types of structural panels from materials such as thermoplastics and other polymeric materials. Such procedures have generally utilized a polymeric material that can be formed into a foamed structure and thereafter placed between outer skins that give the panel structure strength and durability. One particularly widespread technique for producing the structural panels of this type is a foaming process wherein a polymeric material such as polystyrene, polyurethane and the like is foamed either between the outer skin surfaces or is foamed and the outer skin surfaces are physically attached to the foamed structure to produce the structural panel. While these types of panels have wide utility as thermal insulation panels, decorative panels and the like, they generally do not have good load bearing or strength properties.

Another recently disclosed method for producing structural panels has been in a very elaborate and difficult to manage method for expanding thermoplastic materials to produce a cellular type construction. In this method, a thermoplastic material is placed between an elaborate heated mold apparatus wherein the thermoplastic sticks to or adheres to the mold halves and then they are pulled apart to expand the thermoplastic material into a type of cellular structure. These procedures are broadly disclosed in such references as U.S. Pat. No. 3,919,379, issued Nov. 11, 1975; U.S. Pat. No. 3,919,381, issued Nov. 11, 1975; and U.S. Pat. No. 3,765,810, issued Oct. 16, 1973.

While the foregoing methods for producing structural panels from thermoplastic materials that stick to and adhere to portions of a mold system have been used to produce some types of structural panels, they have no utility in the production of structural panels from various other materials such as cement, clay-like materials and the like. Additionally, it will be appreciated that such previously disclosed methods for preparing and manufacturing structural panels from thermoplastic materials are indeed expensive, complicated and difficult to operate to produce panel structures of uniform quality.

It is, therefore, apparent that there is a need for improved methods and apparatus for producing structural panels. It is also apparent that there is a need for a method and apparatus for the low cost, rapid production of structural panels from readily available materials such as cement mixtures, clay materials, thermoplastic materials and the like. It is also apparent that there is a need for a low cost structural panel that can be produced from readily available materials with the panel structure having improved balance of strength, load bearing and weight properties.

SUMMARY OF THE INVENTION

Accordingly, it is an object of this invention to provide an improved structural panel. It is another object of this invention to provide an improved method and apparatus for forming structural panels. It is yet another object of this invention to provide an improved method and apparatus for forming a cellular panel structure having improved strength, load bearing and weight properties. Other aspects, objects and advantages of this invention will be apparent to those skilled in the art from the following description and appended claims.

In the instant invention, an improved panel structure having high strength and high load bearing properties with a relatively low weight is produced using a unique method and apparatus. The improved panel structures of this invention have essentially planar face surfaces. The face surfaces of the panel structure are supported by a plurality of tapered walled cells that are intermediate the two faces of the structure. The tapered walled cells generally have one opened end adjacent one of the faces of the panel structure with the other end of the tapered walled cell being closed and being positioned adjacent the other of the faces of the panel structure. The closed end of the tapered walled cell is generally the apex of the tapered wall structure. Approximately half of the tapered walled cells open on one face surface of the panel structure and the remaining half of the tapered walled cells open on the other face surface of the panel structure. The walls of the various tapered cells are common walls with the adjacent tapered cells throughout the structure. The cross-sectional areas of the individual cells are defined by a continuous curvilinear wall. The cross-sectional areas of the tapered walled cells generally increase as the distance from the apex of the tapered wall cell increases to a point of maximum cross-sectional area and then the cross-sectional area decreases to a cell opening in the face surface to thereby form a shoulder adjacent the face surface of the panel structure where the tapered wall cell opens into such face surface. Therefore, the opening of the tapered wall cell is generally a curvilinear opening and has a smaller cross-sectional area than the cross-sectional area of the tapered wall cell at a point intermediate the two face surfaces. The face surfaces of the panel structure are generally planar and are generally substantially parallel to each other.

The improved structural panels of this invention are produced by placing a moldable material between two mold halves. The mold halves have substantially planar bases with a plurality of upstanding deformable mold fingers affixed to the planar surfaces of the mold halves. The deformable mold fingers generally extend away from the surfaces of the planar mold halves at substantially right angles. The mold halves are oriented such that the deformable mold fingers are in non-aligned orientation as the mold halves are brought together. The deformable mold fingers are made from a deformable material such as heavy rubber, heavy plastic or the like. The mold fingers are adapted to allow at least a portion of the walls of the mold fingers to deform outwardly while the apex of the mold fingers remains at substantially the same cross-sectional area and the base of the mold fingers remains at substantially the same cross-sectional area whereby the portion of the mold fingers that is intermediate the base and the apex of the mold fingers can expand outwardly to a cross-sectional area that is substantially greater than the cross-sectional area at the base and the apex of such mold fingers.

The improved structural panels are produced by forming a moldable composition of the material the panels are to be made from and, thereafter, placing such moldable composition between the mold halves. The mold halves are brought together and while the halves are brought together, the mold fingers are deformed whereby the portion of the mold fingers intermediate the base and the apex expands outwardly. Following the outward expansion of the walls of the mold fingers, the mold fingers are then allowed to return to their normal undeformed configuration and the mold fingers are withdrawn from the thus molded panel structure.

DESCRIPTION OF PREFERRED EMBODIMENTS

Figure 1:
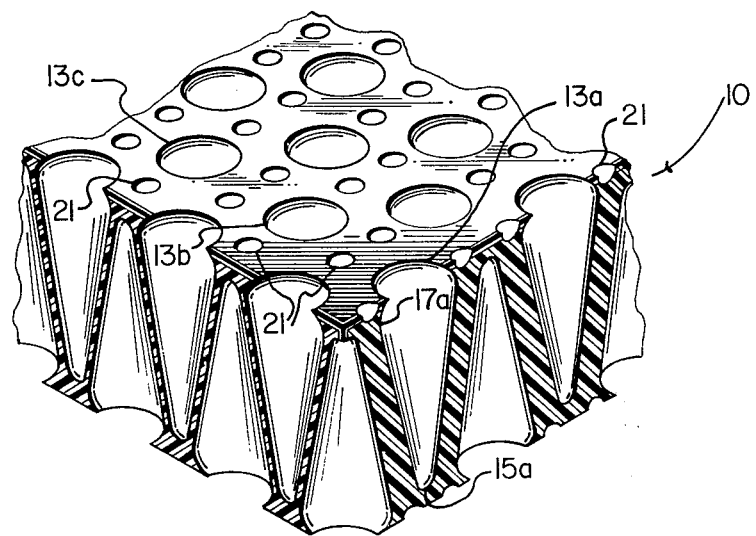
FIG. 1 is a perspective view of a portion of a structural panel in accordance with this invention.

The preferred embodiments of this invention can best be described by referring to the drawings. FIG. 1 is a perspective view of a portion of an improved panel structure of this invention. By examining FIG. 1, along with FIGS. 2 and 3, which illustrate a top view and a side sectional view of the panel, it will be noted that structural panel 10 has a first face surface 11 and a second face surface 12. First and second face surfaces 11 and 12 are spaced apart generally planar surfaces. In most instances, planar face surfaces 11 and 12 will be in parallel planes. By producing panels having planar surfaces 11 and 12, the structural panels can be made in large panel segments wherein the large panels can be utilized for a variety of construction purposes or they can be cut to desired sizes.

Figure 2:
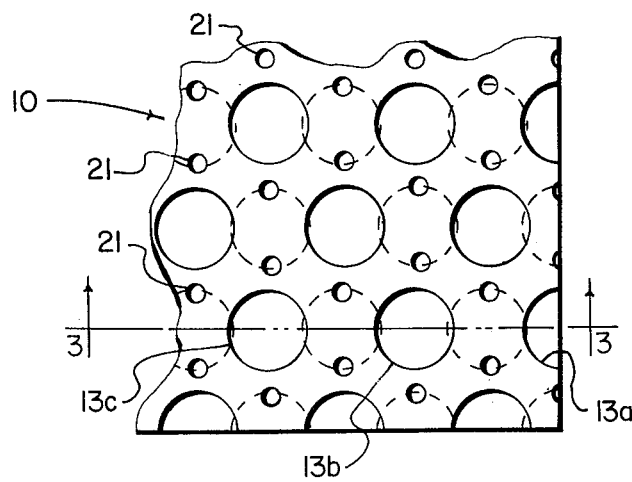
FIG. 2 is a top view of a structural panel in accordance with this invention as viewed perpendicular to one of the face surfaces of the panel.
Figure 3:
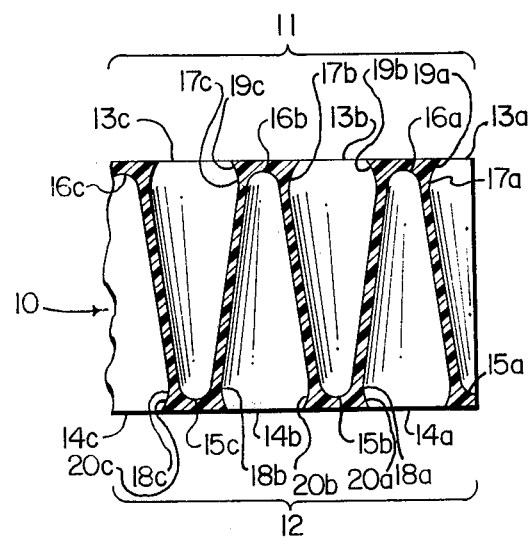
FIG. 3 is a side sectional view, taken along lines 3—3 of FIG. 2, illustrating the tapered wall construction of the panels of the instant invention.

As is more clearly shown in FIGS. 1 and 3, first and second face surfaces 11 and 12 are generally supported by and connected by a plurality of tapered walled cells. The tapered walled cells have one opened end adjacent one of the faces of the panel structure with the other end of the tapered walled cell being closed and positioned adjacent and slightly removed from the other of the faces of the panel structure. The closed end of the tapered walled cell, formed by the uninterrupted face of the panel surface, is generally the apex of the tapered wall cell structure. As is shown in FIGS. 1 through 3, approximately one-half of the tapered walled cells have opened ends along first face surface 11 and the other half of the tapered walled cells have opened ends along second face surface 12. In FIGS. 1 through 3, tapered walled cell openings 13a, 13b and 13c open onto first face surface 11. Tapered walled cell openings 14a, 14b and 14c open onto second face surface 12, as illustrated in FIG. 3. Each of the tapered walled cell structures terminate at the end opposite from the opening, as described above at an apex. Thus, tapered cell wall apex 15a is opposite tapered wall cell opening 13a, while tapered walled cell apex 15b is opposite tapered walled cell opening 15b, etc. Likewise, tapered walled cell apex 16a is opposite tapered wall cell opening 14a while tapered walled cell apex 16b is opposite tapered wall cell opening 14b, etc. It will be noted that the various wall sections of the adjacent tapered walled cells are common to each other and that there are no openings between first face surface 11 and second face surface 12.

The cross-sectional areas of the individual tapered walled cells are defined by continuous curvilinear walls along the entire length of the tapered wall cells. Thus, the cross-sectional areas of the tapered walled cells have outer boundaries that are curvilinear and perpendicular to the axes of the individual tapered walled cells. As more clearly shown in FIGS. 1 and 3, the tapered walled cell structures have generally increasing cross-sectional areas as the distance from the apex increases to points of maximum cross-sectional area at points intermediate face surfaces 11 and 12. From the points of maximum cross-sectional areas, the cross-sectional areas of the tapered walled cells then decrease substantially to smaller cross-sectional areas of the tapered walled cell openings opposite the apex of the tapered wall cell.

As illustrated in FIGS. 1 and 3, points 17a, 17b and 17c are the portions of the tapered walled cell structure having maximum cross-sectional areas intermediate face surface 11 and face surface 12 of the panel structure for the walled cells opening onto face surface 11. Likewise, points 18a, 18b and 18c are the points of maximum cross-sectional area of the tapered walled cells opening onto face surface 12. It will thus be apparent that the decrease in cross-sectional area of the tapered walled cell opening from the point of maximum cross-sectional area of the tapered walled cell forms a continuous shoulder around each of the tapered walled cell openings along and adjacent each face surface of the structural panel. Thus, continuous shoulders 19a, 19b and 19c and high strength shoulder members around each of the tapered walled cell openings disposed along face surface 11. Likewise, continuous shoulders 20a, 20b, 20c, etc., are disposed around each of the tapered walled cell openings 14a, 14b, 14c, etc., disposed across the face surface 12 of the panel. These shoulders are extremely strong since they are continuous shoulders around the curvilinear openings of the tapered walled cells. The area of increased thickness adjacent the shoulders provides the necessary rigidity and strength of the panel structure to allow it to withstand a considerable load from any direction. By virtue of the tapered wall cell structure, the structural panel has very low weight, but exhibits extreme desirability in the amount of load and stress that the panel can withstand from any direction.

The presence of the shoulders and the presence of the portions of the face surfaces of the panel structure produce a very strong unitary panel construction that has extremely good load bearing and strength properties. Thus, the panel construction, as illustrated, has good load bearing properties when loads are applied either perpendicularly to the face surfaces areas or when loads are applied parallel to the planes of such surfaces. These properties distinguish the panels of the instant invention from prior art types of honeycomb structures which do not possess good load bearing properties, especially when loads are applied parallel to the planes of their surface faces.

The sectional view of the panel structure shown in FIG. 3, of course, is a sectional view showing the walls of the tapered walled cell structure having the thinnest walls between the cells as is obtained when the adjacent tapered walled cells are aligned in a straight line, as shown in FIGS. 1 and 2. It will be appreciated that there will be other portions of the common walls between the various adjacent tapered walled cells that are thicker than those illustrated in the sectional view shown in FIG. 3. Such thicker walls, of course, will produce added strength in the finished panel structure. The orientation of the various tapered walled cells throughout the structural panel is a matter of choice. However, it has been found that an orientation of the axes of the various tapered walled cells in a diamond shaped or square shaped pattern is especially preferred. The structure illustrated in FIGS. 1 and 2 shows the orientation of the various tapered walled cells in a diamond pattern. In the preferred embodiments of this invention, the axes of the tapered walled cells are substantially perpendicular to the planes of the face surfaces of the panel structure. It will be appreciated that the apex of the tapered walled cell structures extending through the panel structure from the other side will be positioned immediately behind or below the apparently solid face surface area lying in the central region between the various diamond shape openings of the tapered walled cells shown in FIGS. 2 and 3.

As previously mentioned, the preferred structure of this invention is one in which approximately one half of the tapered walled cells open onto one side of the structure with the remaining half of the tapered wall cells opening on the opposite face surface of the structure. The phantom lines shown in FIG. 2 represent the location of the cell openings through the other face surface section of the panel structure directly below the illustrated face surface.

The exact location of the various tapered walled cells is a matter of choice. It will be appreciated that at uniform cell sizes, the closer the cells are together, the lower the weight of the finished panel will be. Because of the unique shoulder configuration adjacent the face surfaces of the panel structure, the load bearing properties of the panel are excellent even when the cells are closely spaced across the panel structure.

Figure 9:
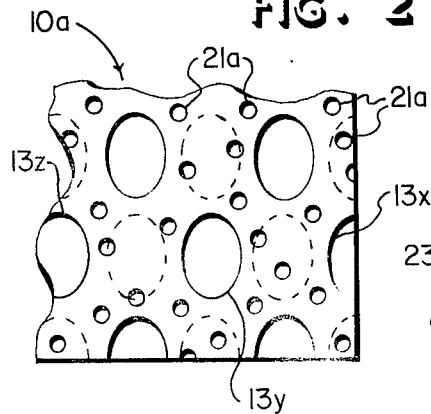
FIG. 9 is a top view of another preferred embodiment of the invention illustrating a structural panel having tapered walled cells of a different cross-sectional configuration, as viewed perpendicular to one of the face surfaces of the panel.

The curvilinear continuous walls of the cells, when viewed perpendicular to the axes of the cells, can be any curvilinear configuration. Such curvilinear construction more evenly distributes stresses and loads throughout the structure than when the cell walls have straight walls that angularly interesect each other. The curvilinear walls can be substantially circular, substantially elliptical, substantially oval and the like. Curvilinear wall sections substantially in the form of a circle are illustrated in FIG. 2. Such a structure has excellent load bearing characteristics in any direction. Curvilinear wall sections substantially in the form of an ellipse are illustrated in FIG. 9. The elliptically shaped cross-sectional areas of the tapered walled cells are preferred when the structural panels will be subjected to loads from one predominant direction. Thus, when a load is to be applied to the panel parallel to one of the surface faces, the elliptical shaped cells will have superior load bearing properties when the panel is oriented with the load being applied in a direction that is substantially parallel to the major axis of the ellipse that shapes the cross section of the cells. Therefore, if a load is being applied parallel to the face surfaces of the panel illustrated in FIG. 9 from the top or the bottom of the Figure, the panel would have extremely good load bearing properties. In face, the load bearing capabilities of such a panel would be greater than if the load was applied from the sides of the panel illustrated in FIG. 9.

As illustrated in FIG. 9, the substantially elliptical cell openings 13x, 13y and 13z and disposed in one of the panel face surfaces much like openings 13a, 13b and 13c are illustrated in FIGS. 1–3. The phantom lines shown in FIG. 9 represent the similar openings in the other panel face surface that lies immediately below the illustrated face surface. Dimples 21a can be disposed in the face surfaces of the panel illustrated in FIG. 9 if desired.

The improved panel structures of this invention can be made from various materials including asbestos cement materials wherein asbestos fibers are mixed with a portland cement material and the resulting mixture is molded. Additionally, other portland cement based materials can also be utilized to produce the improved structures from such as mixtures of portland cement and fibrous reinforcing agents such as fiberglass, nylon fibers and the like. Additionally, the improved panel structures of this invention can be made from clay materials, thermoplastic materials, such as styrene, ABS plastic materials, polyethylene, polypropylene, acrylic polymers and the like. The panel structures can also be made from various types of precursors that will react and harden when they are mixed together. Therefore, it will be appreciated that the structures of this invention can be made from any type of moldable material that can be molded into shape and allowed to cure or solidify.

It has been found that the panel structures of this invention that are made from mixtures of portland cement and various reinforcing agents, such as fiberglass, asbestos fibers and the like, are especially useful in the construction industry. Such panels have many desirable properties, including low weight panels that can withstand a considerable amount of stress and load from any direction. The portland cement type panel components appear to gain strength as they are allowed to cure over long periods of time. Additionally, they can be easily sawed into desired configurations and they can be easily assembled by nailing, by drilling and affixing screws and bolts through such drilled holes, by applying adhesives and the like. The resulting structure is a lightweight and extremely durable structure that resists weathering, actions by various corrosive chemicals and a considerable amount of mechanical stock.

It will be appreciated that the dimensions of the various structural panel components are a matter of choice. It has been found, however, that in producing reinforced portland cement type panels, such as asbestos or fiberglass reinforced portland cement, that the panels will preferably have a thickness of from about two to about six inches from one face to the other face of the panel. The cross sectional area openings of the tapered walled cell structures in the face surfaces of the panels will be preferably in the range of from about 0.5 square inches to about 4 square inches. The thickness of the walls of the tapered walled cells at their thinnest point will preferably be at least about one-sixteenth of an inch with the minimum distance between the edges of adjacent tapered wall cell openings being about one inch apart. Preferably, the cross-sectional area of the tapered walled cell openings will be at least about ten percent less than the maximum cross-sectional area of the tapered wall cell structure at its greatest point, thereby forming a continuous shoulder around the cell opening. Cross-sectional areas of the openings are preferably at least twenty percent less than the maximum cross-sectional areas of the cell because a more substantial and stronger shoulder is formed, thereby improving the load bearing properties of the finished panel structure unit. The minimum size of the tapered walled cell opening will be at least large enough to allow the withdrawal of the molding equipment utilized to form the improved panel structure. In a preferred embodiment, the minimum thickness between the face surface of the structural panel and the apex of the tapered wall cell structure immediately beneath such face surface will be at least about one-eighth inch. This thickness, of course, can vary over a wide range. In some instances, however, it may be desirable to have an opened bottom tapered walled cell structure wherein the apex of the tapered walled cell structure is in the same plane as the face surface of the panel structure opposite the tapered wall cell openings. In such instances, the panel structure of this invention would not be a panel structure wherein there is a seal between the two face surfaces of the panel structure. Such a structure is not particularly preferred from a structural strength standpoint because a considerable amount of load bearing strength is obtained when the apex of the tapered wall cell lies below the face surface that is opposite the tapered cell wall opening. The thickness of material immediately beneath the apex of such tapered walled cell and the face surface of the structural panel adds a considerable amount of strength and load bearing capability to the entire structure.

If desired, the various face surfaces of the structural panel may be "dimpled" wherein small depressions appear across the face surfaces of the panels. As illustrated in FIGS. 1 and 2, a plurality of dimples 21 are disposed across the surfaces of the panel. These dimples, of course, lessen the total weight of the structural panel without any undue loss in the strength and load bearing properties of the panel. Additionally, such dimples give the structural panels additional preferred properties, especially when the structural panel is installed and materials such as plaster and the like are spread across the surface of the panel. The dimples give the plaster additional surface area to adhere to, thereby improving the overall properties of the panels.

Figure 4:
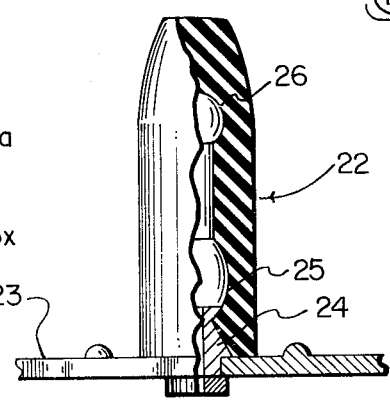
FIG. 4 is a side elevational view of one of the deformable mold fingers of the apparatus of this invention with a portion of the mold finger removed to expose the construction thereof.

The apparatus for producing the improved panel structures which have been described above, generally includes a mold assembly having two halves. Affixed to each of the mold halves is a plurality of deformable mold fingers that extend inwardly toward the opposing mold halves. FIG. 4 illustrates one preferred type of mold finger 22. Mold finger 22 is made from a durable deformable and resilient material such as natural or synthetic rubber. Preferably, it is molded to produce a continuous elongated outer wall having generally straight lower and intermediate side walls and terminating with a generally rounded upper end. The outer walls can be generally cylindrical or they can have other curvilinear outer walls when viwed in cross-section (i.e., when viewed in cross section perpendicular to the vertical axis of such fingers). If preferred, the mold finger can have tapered outer surfaces wherein the cross-sectional area of the finger progressively decreases from its base toward the upper end. The central portion of the mold finger is hollow. As shown in FIG. 4, mold finger 22 is affixed to mold half support 23 by any suitable means. One particularly preferred method for attaching mold fingers 22 to mold base 23 is by means of an aperture in the lower end of mold finger 22 which is inserted over an upstanding finger bracket 24 which is rigidly affixed to and carried by mold base 23. Finger bracket 24 has an outwardly extending lip at the top thereof that will fit over at least a portion of the base of mold finger 22 to hold it in place. Other methods for affixing mold fingers 22 to mold base 23 can be by glueing the mold fingers to the mold base, by fastener means such as screws extending upwardly into the base of mold fingers 22 from mold base 23 or by other suitable brackets and fasteners.

The interior portions of mold finger 22 are generally hollow. Slightly above the lower end of mold finger 22, the interior portion of the mold finger is removed to produce a relatively thin walled section that has a generally toroidal interior wall shape. Thus, as shown in FIG. 4, at point 25, the walls of the mold finger are relatively thin around the entire circumference thereof. Immediately above point 25, the walls of mold finger 22 become thicker and remain thick as the hollow bore extends upwardly to point 26 wherein the walls of mold finger 22 again become thin. Point 26 is a generally spherical void in the interior portion of mold finger 22. The circumferential portion of mold finger 22 surrounding point 26 is a thin walled portion of the mold finger. The portion of the mold finger above point 26 is thick material such as is illustrated in FIG. 4. As will be explained hereinafter, points 25 and 26 along the walls of mold finger 22 allow the mold finger to be deformed when pressure is exerted on mold finger 22 along its axis such as by applying pressure to the topmost end of mold finger 22. When such compressive pressure is applied to the upper end of mold finger 22 and mold base 23 is fixed, the mold finger will deform in a manner such that a portion of the side walls of mold finger 22 will deform outwardly while the base of mold finger 22 remains at substantially the same relative diameter and while the upmost tip of the mold finger will remain undeformed. The deformable mold fingers can also be deformed outwardly by means of some internal force such as an inflating type force that can be supplied to the interior of the mold fingers to cause at least a portion of the mold fingers to expand outwardly. In such instances, the inflating type force can be supplied by high pressure fluid such as water, air and the like, being injected into the interior of the mold fingers through fluid ports 29. The desired deformation can also be achieved by a combination of internal pressure and external compressive forces on the mold fingers.

Figure 5:
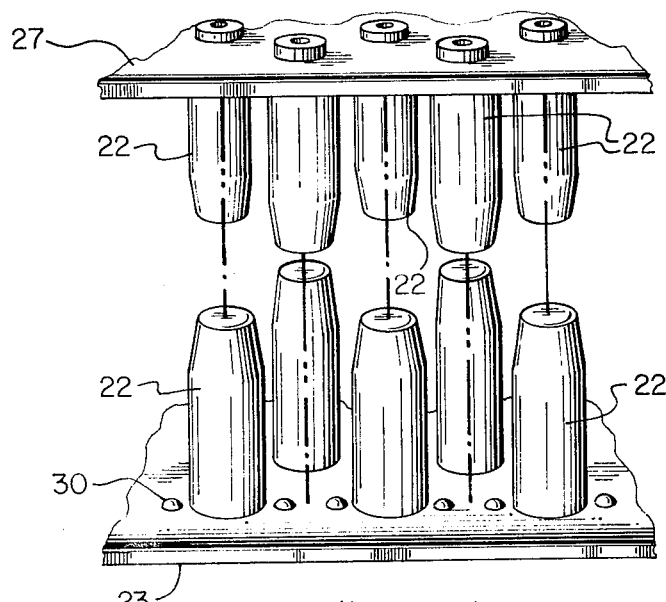
FIG. 5 is a perspective view of two mold halves of the instant invention showing the arrangement of the plurality of deformable mold fingers before the moldable composition is placed between the mold halves and before they are closed together.

As shown in FIG. 5, lower mold base 23 supports a plurality of mold fingers 22. The mold fingers 22 are arranged in the preferred orientation to produce the desired structural panel. In FIG. 5, the plurality of mold fingers 22 are arranged in a generally diamond shape to produce a panel structure such as that illustrated in FIGS. 1 through 3. Upper mold half 27 also supports a plurality of mold fingers 22 in a fashion as has been described above with reference to FIG. 4. The orientation of mold fingers 22 which are carried by upper mold half 27 is also in a diamond configuration. However, the mold fingers carried by the opposing mold halves are oriented such that the individual mold fingers are non-aligned with each other whereby when the mold halves are brought together, mold fingers 22 from upper mold half 27 will be positioned in the areas between mold fingers 22, which are carried by lower mold half 23. This non-aligned arrangement allows for the production of the structural panels wherein half of the tapered walled cell structures will open on one side of the completed panel and the other half of the tapered walled cell structures will open on the opposite face surface of the panel structure with continuous common walls between the adjacent cells of the structure. As previously mentioned, the orientation of the various mold fingers can be any desired orientation. Therefore, it is not necessary that the mold fingers appear in a diamond shape configuration. Other patterns such as triangular patterns, square patterns, hexagonal patterns and the like, can be utilized.

Mold halves 27 and 23 are carried by suitable structure, not shown, to allow the halves to be brought together when the moldable material for production of the panels is disposed between the mold halves. Any suitable means for bringing the suitable mold halves together can be utilized. One preferred method and apparatus for bringing the mold halves together is a hydraulic press arrangement wherein mold halves 23 and 27 are affixed to suitable hydraulic press equipment to allow them to be forced together under great pressure. For example, a large Carver press can be utilized to bring the mold halves together, with the moldable material disposed therebetween.

To produce the improved structural panels of this invention, the moldable material, such as a fiber reinforced portland cement mixture is prepared by mixing the necessary ingredients together. The recipes for making moldable portland cement-fiber materials such as asbestos-cement materials are well known in the art. Normally, the weight percent of cement to asbestos will be from about 10 to about 75 weight percent on a dry basis. Thus, the various precursors such as portland cement, asbestos fibers and water are mixed together to produce a moldable material. In the instant invention, the moldable material is placed between the mold halves and the mold halves are brought together to mold the improved structural panel. It may be desirable to produce a thin sheet of the moldable material by mixing the precursors together and then rolling the moldable material into a thin sheet which can then be placed between the opened mold halves. As previously mentioned, the method and apparatus of this invention can be utilized to mold practically any type of moldable material, such as clay, asbestos cement, portland cement mixtures with various reinforcing agents such as fiberglass, nylon and the like, thermoplastic materials, materials that can be mixed together to form a moldable material that will "set" into a rigid material, heat setting polymeric materials, and the like.

Figures 6, 7:
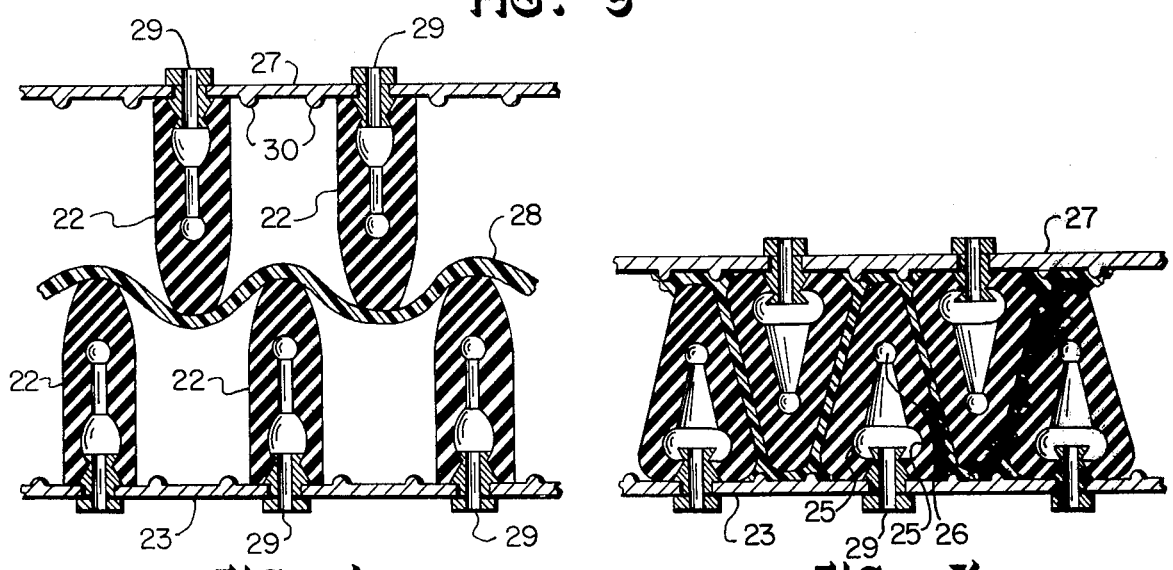
FIG. 6 is a side sectional view of a portion of a mold apparatus with the mold fingers shown in a sectional view as the mold halves are being closed with the moldable composition disposed between the mold halves.
FIG. 7 is a side view of a portion of the mold halves with the mold fingers shown in sectional view with the mold halves being in a closed position and the mold finger walls being deformed outwardly.
Figure 8:
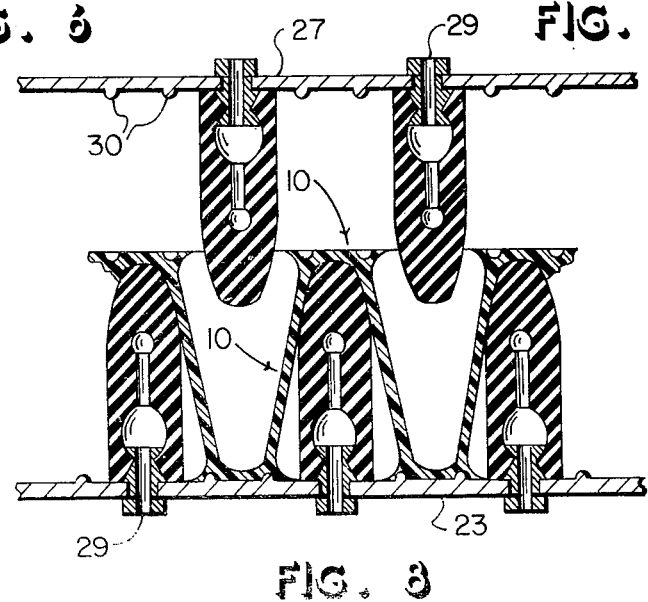
FIG. 8 is a side view of the mold halves of the instant invention with the deformable mold fingers being shown in sectional view with such mold fingers being in their original non-deformed state just as the mold halves are about to be fully opened following the formation of the structural panels of this invention.

FIGS. 6 through 8 show a typical molding cycle wherein a panel structure is formed using a molding apparatus such as is partially depicted in FIGS. 4 and 5. In FIGS. 6 through 8, a portion of a mold apparatus is illustrated with the mold fingers shown in a sectional view to describe how the mold fingers function to form the improved panel structure having the plurality of adjoining tapered walled cells. FIG. 6 is the start of the molding cycle wherein lower mold base half 23 and upper mold half 27 each carry a plurality of mold fingers 22 and are partially open. In FIG. 6, the two mold halves have started to move together. While the mold halves are furthest apart, a sheet of the moldable material 28 has been placed between the two mold halves. In FIG. 6, the sheet of moldable material 28 is being deformed as the mold halves move together. In this configuration, mold fingers 22 are in their non-deformed state. In other words, mold fingers 22 which have generally cylindrical sides are not under pressure to cause any deformation thereof. The mold halves move together by means of a suitable apparatus such as a hydraulic press to force them into a closed configuration such as is shown in FIG. 7.

In FIG. 7, the sheet of moldable material 28 has been forced into all of the voids between mold fingers 22 and upper and lower mold halves 23 and 27. As the mold halves 23 and 27 are pressed together with continuing force, a considerable amount of force will be exerted on the uppermost tips of mold fingers 22. As this force continues, the thin side wall areas 25 of mold fingers 22 will allow the sides of fingers 22 to be deformed outwardly. As the sides of mold fingers 22 flare outwardly, immediately above the thin walled circumferential area around and above point 25, the thin walled circumferential area in the uppermost portion of finger 22 at point 26 will also undergo stress whereby the walls of mold finger 22 will bend or deflect outwardly, thereby causing the overall shape of mold finger 22 to take on a tapered or conical like appearance. The portion of mold fingers 22 immediately below point 25 in the walls thereof will also deflect or deform outwardly as illustrated with the lowermost portion retaining its approximate diameter as when no pressure is applied. As uniform pressure and force is exerted across mold halves 23 and 27, all of the mold fingers 22 will undergo the same type of deformation, as described above and is illustrated in FIG. 7. With this deformation, the moldable material 28 fills essentially all of the voids and spaces between the various deformed mold fingers and upper and lower mold halves 23 and 27.

If desired, the mold halves can be held in place, as shown in FIG. 7, for a period of time sufficient to allow the moldable material to partially cure or harden. In some instances, it may be desirable to add a hot fluid such as steam, hot air, hot water, hot oil and the like to the interior of mold fingers 22 through fluid ports 29 which can be attached to a suitable steam source, now shown. By adding a hot fluid such as steam to the interior of mold fingers 22, a considerable amount of heat can be transferred through the walls of mold fingers 22 to assist in the rapid curing of the moldable material, as it is held in place between the various mold fingers 22 and upper and lower mold halves 23 and 27. In many instances, it is not necessary to maintain the mold halves in the position shown in FIG. 7 for an extended period of time. This is especially true when a hot thermoplastic material is molded. In such instances, the material is molded and a coolant fluid can be injected into the interior of mold fingers 22 through ports 29. If desired, the back sides of mold halves 23 and 27 can also be heated or cooled to supply a heating or cooling to the material being molded. As previously mentioned, the mold fingers may be deformed outwardly by injection of high pressure fluids into the mold fingers to partially inflate or expand the mold fingers outwardly to the desired shape.

Following the partial curing of the moldable material to allow it to retain its shape, the mold halves 23 and 28 are moved apart, as shown in FIG. 8. As the mold halves move apart, the compressive force is removed from mold fingers 22 and they return to their undeformed state. As they return to their undeformed state, the mold fingers are withdrawn through the openings that appear along the upper and lower face surfaces of the molded panel. As shown in FIG. 8, upper mold half 27 is withdrawn from completed panel structure 10 and thereafter lower mold half 23 can likewise be withdrawn from the completed panel structure.

As shown in FIGS. 6 through 8, a plurality of raised sections 30 can be incorporated into the faces of upper and lower mold halves 23 and 27 to produce the desired "dimples" or depressions 21 in the face surfaces of the finished panel 10.

It will be appreciated that the degree of force that must be exerted on mold halves 23 and 27 to obtain the desired compressive force along the length of mold fingers 22 to have the desired deformation will depend on the wall thicknesses of the various mold fingers. Pressures in the order of at least several hundred pounds per square inch are not uncommon. The high pressures produce very dense, uniform and strong panel structures.

Following the molding process, the structural panels can be cured for any desired length of time to produce the desired strength and load bearing properties.

It will be appreciated that the foregoing disclosure has been directed to only some of the preferred panels of the invention and to equipment and methods for making them. It is also within the scope of the invention to provide a panel and equipment for making it wherein the tapered walled cells all open on only one side of the panel with the other panel face surface being essentially planar without apertures. Additionally, it is in the scope of this invention to provide panels having an unequal number of cell openings onto two face surfaces of the panel. The panels of this invention can also have cell structures that are of different or mixed sizes and configurations within the same structure.

The structural panels can be utilized in a wide variety of applications. Because of thier load bearing and strength properties, the panels can be utilized as walls, roof decks and ceiling decks in buildings. If desired, the various voids that are formed by the tapered walled cell structures can be filled with a low density sound or thermal insulating material to produce an integrated panel structure that is especially useful in the construction of houses and the like. Also as previously mentioned, the panel structures can be plastered, painted or otherwise decorated. Additional skin membranes can also be applied to the various face surfaces of the panel to further improve the structural properties of the panels.

It should also be understood that various changes and modifications may be made in the following description without departing from the spirit and scope of this invention.

I claim:

1. A panel structure having a first planar face surface and a second planar face surface and a plurality of tapered walled cells lying intermediate and supporting said first planar face surface and said second planar face surface, said tapered walled cells opening outwardly from at least one of said first planar face surface and said second planar face surface at one end of each of said tapered walled cells and each of said tapered walled cells terminating at an apex at the other end of each of said tapered walled cells with the cross-sectional areas of each of said tapered walled cells being defined by a continuous substantially curvilinear wall, said continuous curvilinear wall tapering upwardly and outwardly from said apex along the axis of said tapered walled cell to a point of maximum cross-sectional area and then said cross-sectional area of said tapered wall cells decreasing substantially from said maximum cross-sectional area to an opening having a cross-sectional area substantially smaller than said maximum cross-sectional area adjacent the planar face surfaces opposite said apex, thereby forming a continuous shoulder adjacent said opening of said tapered walled cell.

2. The panel structure of claim 1 wherein said structure is asbestos-cement.

3. The panel structure of claim 1 wherein said structure is fiberglass reinforced cement.

4. The panel structure of claim 1 wherein the cross-sectional area of each of said openings of said tapered, walled cells is at least 20 percent less than the maximum cross-sectional area of said tapered, walled cells.

5. The panel structure of claim 1 wherein substantially one-half of said tapered walled cells open onto said first planar face surface and the remaining half of said tapered walled cells open onto said second planar face surface.

6. The panel structure of claim 1 wherein said apex of each of said tapered walled cells lies below the outer surface of the planar face surface of said structure opposite the opening of each of said tapered walled cells.

7. The panel structure of claim 1 wherein the cross-sectional area of each of said openings of said tapered walled cells is at least ten percent less than the maximum cross-sectional area of said tapered walled cells.

8. The panel structure of claim 4 wherein said continuous curvilinear wall defines a substantially circular cross-sectional area.

9. The panel structure of claim 4 wherein said continuous curvilinear wall defines a substantially elliptical cross-sectional area.

* * * * *